MICHAEL S. HERSH
Harry A. Herbert Jr.
Jacob N. Erlich
ATTORNEYS

June 30, 1970  M. S. HERSH  3,518,402

METHOD FOR SEALING HIGH PRESSURE TUBES

Filed Sept. 11, 1968  2 Sheets-Sheet 2

INVENTOR.
MICHAEL S. HERSH
BY Harry A. Herbert Jr.
and
Jacob N. Erlich
ATTORNEYS

United States Patent Office 3,518,402
Patented June 30, 1970

3,518,402
METHOD FOR SEALING HIGH PRESSURE TUBES
Michael S. Hersh, San Diego, Calif., assignor to the United States of America as represented by the Secretary of the Air Force
Filed Sept. 11, 1968, Ser. No. 758,945
Int. Cl. B23k 9/00
U.S. Cl. 219—137                                          3 Claims

ABSTRACT OF THE DISCLOSURE

A method of sealing a high pressure tube by welding made up of the steps of inserting a tapered plug within the tube to be welded and applying the arc of a welder to the tip of the tapered plug. The plug melts forming a highly reliable seal.

BACKGROUND OF THE INVENTION

This invention relates generally to a method for sealing high pressure tubes and more particularly to a welding method for sealing high pressure tubes.

Due to the expanding technology in the area of utilizing fluids under extreme pressure there has arisen the need to construct high pressure tanks capable of storing fluids for prolonged periods of time. The tanks are filled through suitable high pressure filler tubes, and once the tanks are filled the tubes are sealed. Many problems have arisen due to the sealing process since heretofore no sealing process has produced a seal which is highly reliable, that is, having no leakage.

Reliability of the seal is of the utmost importance since examples of the use of high pressure tanks can be found on the air launched missiles and maneuvering reentry vehicles of our present weapons system. Storable propellants utilized in such vehicles are usually stored in high pressure tanks and it is necessary that these tanks remain in the storage condition under extreme environments for several years. During this time, the tanks must have no detectable leakage.

Tube seals of this nature have in the past, generally, been made by pinching the tube end closed and seal welding the end closed. The problems encountered in this type of seal are numerous, for example, damage to the tube during pinching and cracks at the root of the weld due to expansion stresses and nonuniform weld bead configuration, all of which may lead to a leakage at the area of the seal.

SUMMARY OF THE INVENTION

The sealing method set forth in the instant invention is a welding method which may be used in sealing any high pressure tube, for example, the filler tube of a high pressure tank. In the method of this invention a plug having a tapered outer end is inserted within the tube opening. The welding takes place when a welder such as a heliarc welding torch is applied to the point of the tapered plug. The tapered end of the plug melts down, welding the tube end and creating a uniform weld bead.

The welding method of the instant invention provides a seal in which there is no tube distortion, no cracking, and the minimum weld leak path is greater than the tube wall thickness. The advantages of using the instant method become even more apparent when the welding process is explained in detail hereinbelow. For example, the welder is a heliarc spot welder. It is positioned vertically above the tube plug and does not move. The arc does not wander for it seeks the shortest path to the ground which is the tapered plug tip. As the tip heats and melts, forming the nugget, the arc remains fixed to the highest point of the weld which is at the tube center line. The heat is conducted down into the plug and the tube wall uniformly symmetrically, the lower face of the weld bead is formed in a spherical arc, the center of which is the welding arc. The resultant weld is sound, symmetrical about the tube center line, and causes no nonuniform stress concentrations. No post weld stresses remain which tend to distort the closure of the weld.

It is therefore an object of this invention to provide a sealing method for high pressure tubes which utilizes a welding process which is relatively simple and yet produces a highly reliable seal.

It is a further object of this invention to provide a sealing method for high pressure tubes in which there is no tube distortion or cracking.

It is another object of this invention to provide a sealing method for high pressure tubes in which the minimum weld leak path is greater than the tube wall thickness.

It is still a further object of this invention to provide a sealing method for high pressure tubes which is sound, symmetrical about the tube center line, and which causes no nonuniform stress concentrations.

It is still another object of this invention to provide a sealing method for a high pressure tube which utilizes conventional, currently available components that lend themselves to standard mass producing manufacturing techniques.

For a better understanding of the present invention, together with other and further objects thereof, reference is had to the following description taken in connection with the accompanying drawing and its scope will be pointed out in the appended claims.

Figure 2:
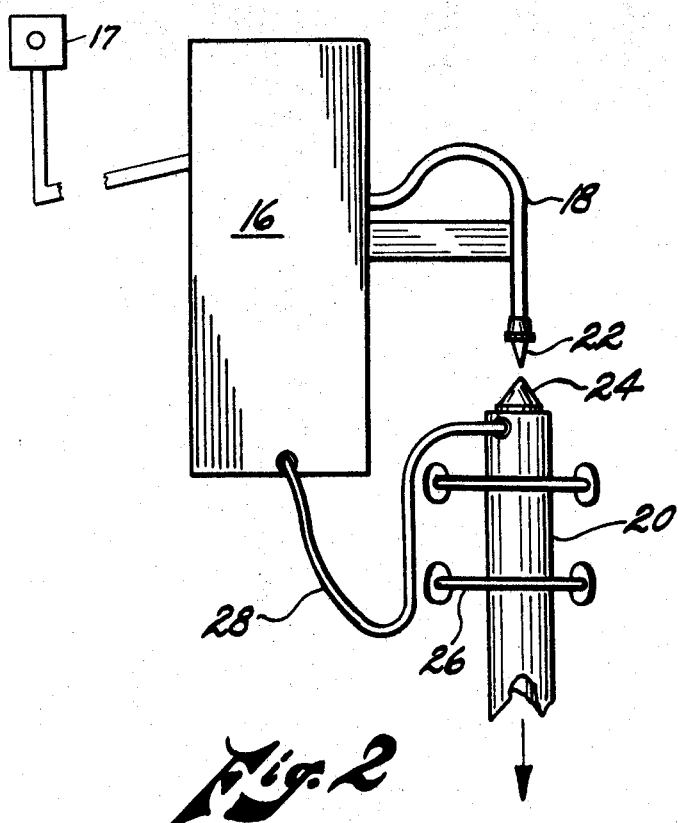
Figure 3:
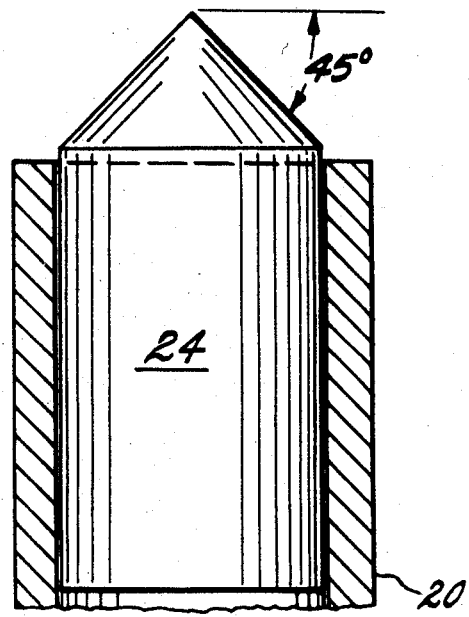
Figure 4:
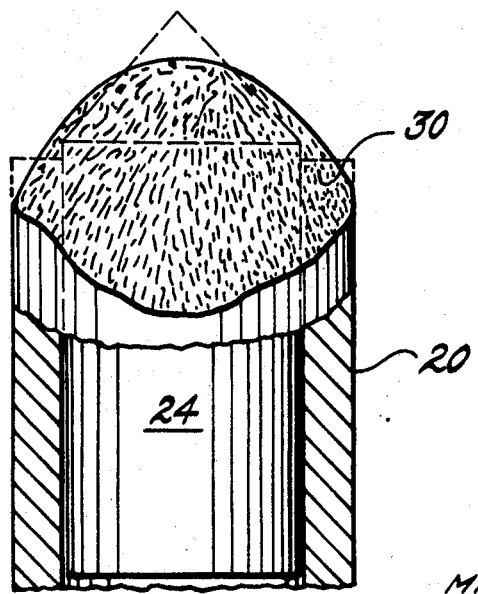

A is square flattened and welded from the top,
B is square flattened and welded from one side, and
C is side flattened, welded from the side;

FIG. 2 represents an elevational view of the heliarc welder used for the method of this invention in conjunction with a high pressure tube to be sealed;

FIG. 3 represents an elevational view partly in cross-section of the tapered plug inserted within the high pressure tube prior to welding by the method of this invention; and FIG. 4 is a view of FIG. 3 after the welding method of this invention wherein the phantom lines represent the tube and plug before welding.

DESCRIPTION OF THE PRIOR ART

Figure 1:
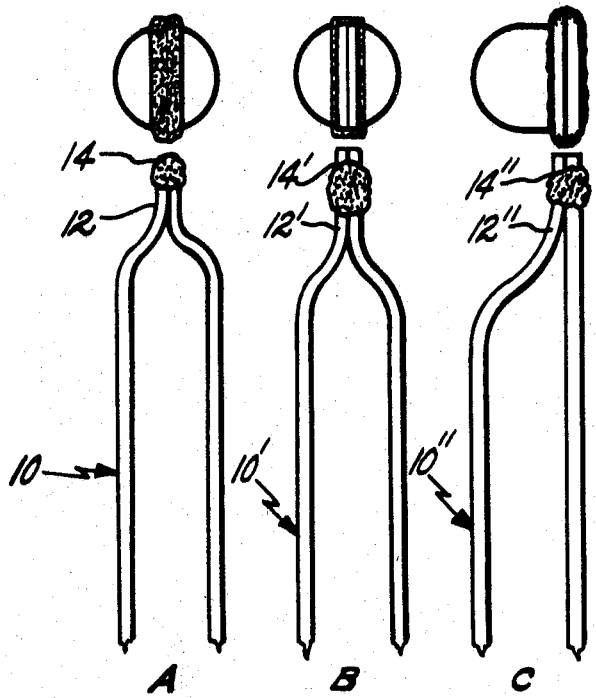
FIG. 1 represents various prior art types of sealing methods, for example.

FIG. 1 represents the prior art methods of sealing high pressure tubes. The tubes 10, 10' and 10" are sealed by pinching their ends 12, 12' and 12", respectively, and seal welding the ends closed forming welds 14, 14' and 14", respectively, thereon. Tube 10 is square flattened and welded from the top, tube 10' is square flattened and welded from one side, and tube 10" is side flattened and welded from the side. In order to weld the tubes 10, 10' and 10" each of the tubes must be first cold worked and the welding torch used for the welding operation must be moved uniformly to distribution the heat to the weld. Once welded the seal or weld is sensitive to cracks initiating at the closure interface when under pressure, thereby resulting in leakage and therefore producing an undesirable seal. Furthermore, damage may occur during the pinching operation. It therefore became necessary to find a method for sealing high pressure tubes which overcame the above shortcomings.

DESCRIPTION OF THE PREFERRED EMBODIMENT

The method of the instant invention produces a sealing weld which overcomes the undesirable results produced by seals hereinbefore in use.

Referring now to FIG. 2, the sealing method of the instant invention may be performed by any suitable welder such as a standard heliarc spot welder 16 having a remote firing switch (not shown) thereon. The welding torch 18 is vertically positioned, free to move only vertically along a straight line, above the tube 20 to be sealed. The torch 18 has thereon a tip 22 having a tapered point and made of any suitable material such as tungsten. The tube 20 to be sealed is positioned vertically beneath the torch. A shaped plug insert 24 having a tapered outer end is inserted within the high pressure tube 20 to be sealed. A plurality of high pressure tube clamps 26 are used to fixedly secure the tube 20 in place and the tube 20 is grounded by wire 28.

Referring now to FIG. 3, it is shown that when it becomes necessary to seal the tube 20 a tapered plug 24 is inserted within tube 20. The plug 24 is preferably made of the same material as the tube 20 such as an aluminum alloy or stainless steel and the taper makes a 45° angle with the horizontal. The plug 24 is of a diameter slightly less than the diameter of the tube 20 and is inserted into the tube 20 approximately up to the beginning of the taper. The plug 24 is frictionally held within tube 20.

Referring now to FIG. 2, the tube 20 is clamped securely in position by suitable clamps 26 in the vertical position directly beneath the torch 18 of heliarc welder 16 and ground wire 28 is attached to tube 20 by any suitable securing means. The welder 16 is remotely set for the proper pulse time and the welder 16 is then remotely fired by any suitable actuating means such as switch 17. The arc from the tungsten tip 22 seeks the shortest path to ground, and therefore goes through the tip of the plug insert 24. The arc is maintained at the plug center until ignition is completed. The weld meltdown 30 is shown clearly in FIG. 4.

The advantages of the method of the instant invention over prior art methods of sealing high pressure tubes is that the tube 20 with the plug 24 therein is placed under the torch of a heliarc spot welder 16. The welder 16 is fired remotely thereby eliminating the problem of firing the welder in the vicinity of volatile propellants which may be in the tank to which the tube 20 is attached. The weld formed produces tight tolerance fit-ups, torch movement during the welding and precise locating of the torch are not required. Furthermore, there is no tube distortion, no cracking, and the minimum weld leak path is greater than the tube wall thickness.

MODE OF OPERATION

The method of the instant invention involves sealing a high pressure tube by welding. A plug 24 having a tapered outer end is inserted within the tube 20 to be sealed. The plug 24 is inserted within the tube until the end of the tube 20 is substantially in line with the start of the taper and is frictionally retained in place due to the diameter of the plug 24 being approximately equal to the internal bore diameter of the tube. The tube 20 is then placed vertically beneath the torch of a welder, such as heliarc welder 16, and clamped in place with clamps 26. A ground wire 28 is attached to the tube 20. The welding 16 is remotely set for the proper pulse time and the welder 16 is then remotely fired by actuating means 17. The arc produced from the tip 22 of the torch 18 seeks the shortest path to the ground and therefore goes through the tip of the plug 24. The arc is maintained at the plug center until the ignition is completed thereby producing the desired weld seal of the instant invention.

Although the invention has been described with reference to a particular embodiment, it will be understood to those skilled in the art that the invention is capable of a variety of alternative embodiments within the spirit and scope of the appended claims.

I claim:

1. The method of sealing the end of a high pressure tube comprising the steps of inserting a plug having a tapered end into said tube with the base of said taper substantially at said tube end and extending outward from said tube, securing said tube vertically beneath the torch of a welder, attaching a ground wire to said tube and firing said welder whereby the arc produced from the tip of said torch seeks the shortest path to the ground and therefore goes through the tip of said plug producing the welded seal.

2. The method of sealing a high pressure tube as defined in claim 1 further comprising the step of maintaining said torch stationary with said arc being directed toward the center of said plug until the desired weld is completed.

3. The method of sealing a high pressure tube as defined in claim 2 wherein said welder is remotely fired.

References Cited

UNITED STATES PATENTS

| 3,188,446 | 6/1965 | Ray et al. | 219—137 |
| 3,293,404 | 12/1966 | Moe et al. | 219—123 |
| 3,045,108 | 7/1962 | Stone et al. | 219—137 |

ANTHONY BARTIS, Primary Examiner

G. A. MONTANYE, Assistant Examiner

U.S. Cl. X.R.

219—123